United States Patent Office 2,918,786
Patented Dec. 29, 1959

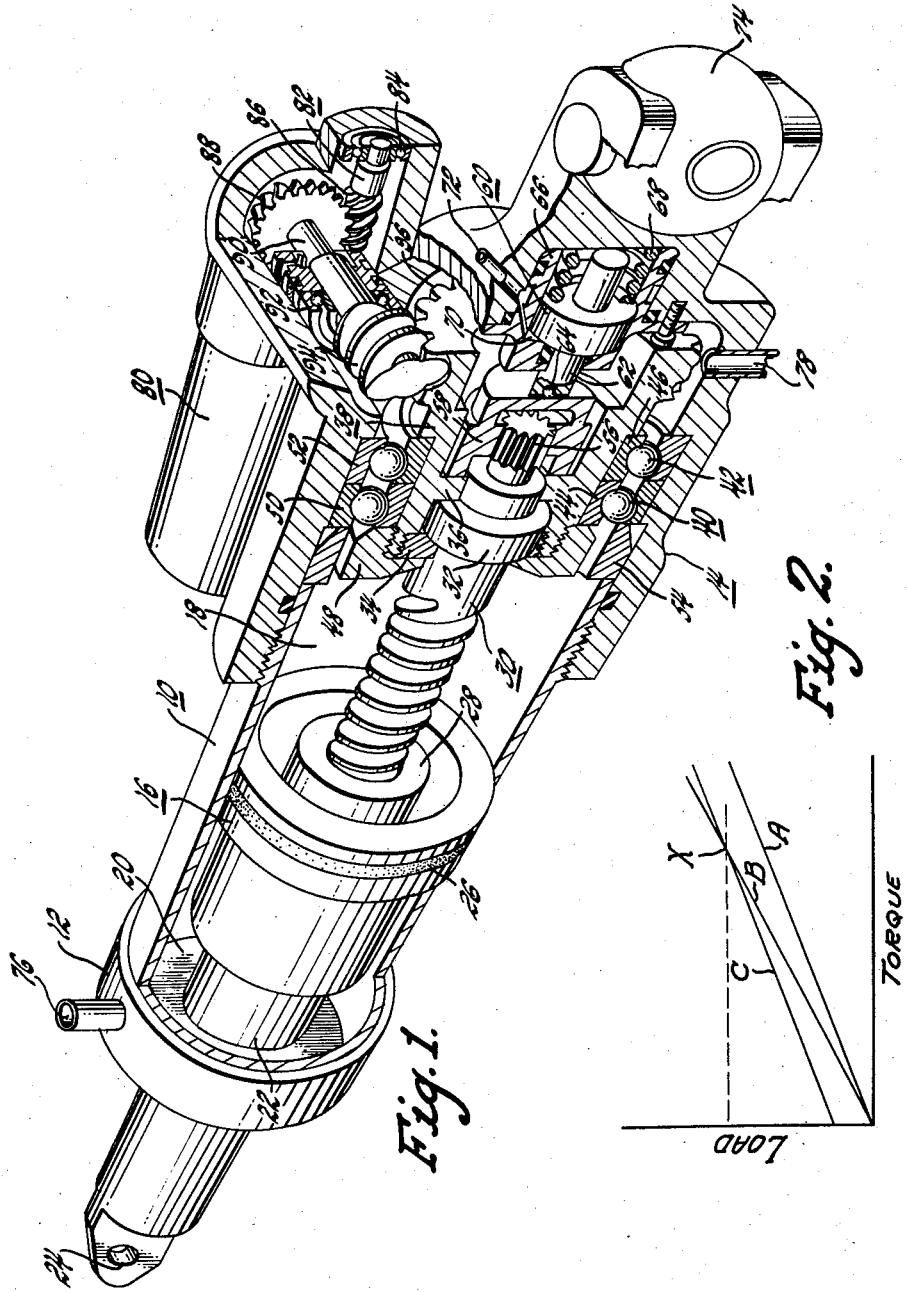

2,918,786

DUAL DRIVE ACTUATOR

Howard M. Geyer, Dayton, Ohio, assignor to General Motors Corporation, Detroit, Mich., a corporation of Delaware Application December 12, 1955, Serial No. 552,481

8 Claims. (Cl. 60—6)

This invention pertains to actuators, and particularly to actuators of the dual drive type.

Dual drive actuators including a cylinder, a piston reciprocable therein, a screw shaft rotatably journaled in the cylinder and operatively connected to the piston such that piston movement is dependent upon screw shaft rotation, and releasable locking means for the screw shaft are disclosed in my Patents Nos. 2,620,683, 2,660,026, 2,660,027 and 2,660,028. However, in these actuators, the locking means must be fully engaged before the auxiliary driving means are operative to rotate the screw shaft. This invention relates to an improved dual drive actuator of the type wherein the releasable locking means include a plain bearing assembly. Accordingly, among my objects are the provision of an actuator assembly including a cylinder having a piston reciprocable therein, wherein the piston may be reciprocated by either fluid under pressure, auxiliary driving means, or both simultaneously; the further provision of a dual drive actuator having releasable locking means including a plain bearing assembly; and the still further provision of a dual drive actuator of the aforesaid type including auxiliary driving means which are operative irrespective of the condition of the locking means.

The aforementioned and other objects are accomplished in the present invention by rotatably journaling the actuator screw shaft in a plain bearing assembly, the actuator including releasable means for applying a resistive torque load on the screw shaft to overload the plain bearing assembly and thereby prevent rotation of the screw shaft relative to the plain bearing assembly. Specifically, the actuator comprises a cylinder having disposed therein a piston capable of fluid pressure actuation in both directions. The piston carries a nonrotatable member, which is constrained for lineal movement therewith. The nonrotatable member threadedly engages a rotatable member through the agency of a plurality of circulating balls. In the disclosed embodiment, the rotatable member comprises a screw shaft and the nonrotatable member comprises a nut whereby piston movement is dependent upon rotation of the screw shaft. The piston includes a rod which extends through one end wall of the cylinder for attachment to a suitable load device which prevents rotation of the piston. Similarly, the cylinder includes a suitable fixture which may be connected to a fixed support so as to prevent rotation of the cylinder.

The piston rod is internally recessed to receive the screw shaft which is coaxially disposed therein. The piston divides the cylinder into a retract chamber and an extend chamber, and the screw shaft is formed with a radially extending shoulder adjacent one end thereof. The screw shaft shoulder is disposed between a pair of annular plain bearing elements constituting a plain bearing assembly for rotatably journaling the screw shaft within the cylinder. In addition, the screw shaft has connected thereto a cup-shaped member which may be engaged by a lock release piston rod for applying a resistive torque load on the screw shaft to overload the plain bearing assembly and prevent relative rotation between the screw shaft and the plain bearing assembly.

The lock release piston is disposed within a lock release cylinder for reciprocable movement, the piston being spring urged so that the rod thereof engages the cup-shaped member so as to engage the locking means. The lock release piston is capable of fluid pressure actuation in the opposite direction to remove the resistive torque load on the screw shaft at all times when the fluid pressure system for operating the actuator is operative.

The actuator also includes auxiliary driving means, which may comprise either a reversible rotary pneumatic motor, a reversible rotary hydraulic motor or a reversible electric motor. The output shaft of the auxiliary driving means is connected through irreversible worm gearing to an annular member which carries the plain bearing elements for rotatably journaling the screw shaft. The annular member is rotatably journaled in the cylinder by a ball bearing assembly, and the irreversible worm gearing is arranged such that while the auxiliary driving means can rotate the screw shaft in either direction through the plain bearing assembly, rotation of the screw shaft cannot rotate the auxiliary driving means, or the annular member. Thus, when the auxiliary driving means are inactive, the locking means are maintained operative to prevent rotation of the screw shaft when the pressure is relieved on the lock release piston so as to apply a resistive torque load to the screw shaft whereby the plain bearing assembly will be overloaded. However, irrespective of whether the locking means are engaged or released, upon activating of the auxiliary driving means, the plain bearing assembly will be rotated. If the locking means are fully engaged, the screw shaft will be rotated through the plain bearing assembly due to the resistive torque load imposed on the plain bearing assembly by the locking means. If the locking means are fully released rotation of the plain bearing assembly will not impart rotation to the screw shaft, and the plain bearing assembly will merely slip relative to the screw shaft. However, if the locking means are partially engaged due to a partial loss of pressure in the fluid pressure system, rotation of the plain bearing assembly will effect rotation of the screw shaft when the resistive torque of the plain bearing assembly and the partially engaged locking means exceeds the screw shaft torque caused by the applied actuator load.

Further objects and advantages of the present invention will be apparent from the following description, reference being had to the accompanying drawing wherein a preferred embodiment of the present invention is clearly shown.

In the drawing:

Fig. 1 comprises a perspective view, partly in section and partly in elevation, of an actuator assembly constructed according to this invention.

Fig. 2 depicts a graph illustrating the manner of operation.

With particular reference to the drawing, an actuator is shown including a cylinder 10, the ends of which are closed by a tail cap 12 and a head cap 14, the tail and head caps having screw threaded couplings with the cylinder 10. A reciprocable piston 16 is disposed within the cylinder 10, and divides the cylinder into an extend chamber 18 and a retract chamber 20. The piston includes a hollow, axially extending rod 22 which extends through a central aperture in the tail cap 12, and has formed thereon an eye 24 by which means the piston rod may be attached to a load device, not shown, which prevents rotation of the piston 16 relative to the cylinder 10.

The piston 16 carries suitable sealing means 26 which engage the internal periphery of the cylinder 10. The piston 16 also has attached thereto a nonrotatable nut 28, which is constrained for linear movement with the piston, the nut 28 threadedly engaging a screw shaft 30 through the agency of a plurality of circulating balls, not shown, which form a component of a ball-screw and nut coupling. Accordingly, movement of the piston 16 is dependent upon rotation of the screw shaft 30.

The screw shaft 30 is formed with an integral radially extending shoulder 32, which is disposed between a pair of plain bearing elements 34 and 36 that prevent axial movement of the screw shaft 30. The plain bearing element 36 is integral with an annular member 38 while the plain bearing element 34 is connected to the annular member 38 by any suitable means, such as a screw thread, whereby the element 34 cannot rotate relative to the annular member 38. The annular member 38 is rotatably journaled within the head cap 14 by ball bearing assemblies 40 and 42, the inner races 44 and 46 of which are restrained against axial movement between a shoulder on the annular member 38 and a nut 48 having threaded engagement with the annular member 38. The outer races 50 and 52 of the ball bearing assemblies 40 and 42, respectively, are retained in position between an internal shoulder on the head cap 14 and a ring 54 disposed between the end of the cylinder 10 and the outer race 50.

The screw shaft 30 is formed with a straight splined portion 56, which receives a cup-shaped member 58 such that the member 58 is connected to rotate with the screw shaft. As alluded to hereinbefore since movement of the piston 16 is dependent upon rotation of the screw shaft 30, if rotation of the screw shaft 30 is prevented, the actuator piston will be locked against movement. As pointed out in my copending application Serial No. 423,180, filed April 14, 1954, now Patent #2,804,053, if a resistive torque load is imposed upon the screw shaft 30 so as to overload the plain bearing assembly, the torque load imposed upon the screw shaft by a load will cause the screw shaft to be locked against rotation relative to the plain bearing elements 34 and 36. In the instant actuator, the means for applying a resistive torque load on the screw shaft 30 so as to overload the plain bearing assembly comprises a reciprocable lock release piston 60 having a rod portion 62, which carries a thrust ball bearing 64 for engaging the cup-shaped member 58. The lock release piston 60 is disposed within a lock release cylinder 66, and is normally urged to the left, as viewed in the drawing by a compression spring 68. However, when pressure fluid is applied to lock release cylinder chamber 70 through lock release port 72, the piston 60 will move to the right so that the thrust ball bearing 64 no longer engages the member 58, and, hence, a resistive torque load is not imposed upon the screw shaft. However, upon release of fluid pressure in the chamber 70, the spring 68 will move the piston 60 so that the thrust ball bearing 64 engages the member 58, thereby imposing a resistive torque load upon the screw shaft to overload the plain bearing assembly.

With reference to Fig. 2, curve A indicates the resistive torque of the plain bearing assembly varying with applied load. Curve B indicates the screw shaft torque varying with load. Curve C indicates the resistive torque of the plain bearing assembly with the locking means engaged, from which it is apparent that if the load is less than that indicated by point X, the screw shaft will be locked against rotation.

The tail cap 12 is formed with a retract port 76 and the head cap 14 is formed with an extend port 78, which ports communicate, respectively, with the retract chamber 20 and the extend chamber 18. The ports 72, 76 and 78 are connected by suitable conduits, not shown, to a valve and a source of fluid under pressure whereby either the retract or the extend chamber may be subjected to fluid under pressure while the other chamber is connected to drain, and simultaneously therewith fluid under pressure will be applied to the lock release port 72. However, upon failure of the fluid pressure source, the spring 68 will move the rod 62 into engagement with the member 58 so as to impose a resistive torque load on the screw shaft to overload the plain bearing assembly and prevent rotation of the screw shaft 30 relative thereto. The tail cap 14 also has attached thereto a fixture 74 by which means the cylinder may be attached to a fixed support, not shown, so as to prevent rotation of the cylinder.

As alluded to hereinbefore, the actuator assembly of this invention includes auxiliary driving means for rotating the screw shaft 30 so as to reciprocate the piston 16 in lieu of fluid pressure operation with the locking means fully engaged, or simultaneously with fluid pressure operation of the actuator with the locking means partially engaged under certain conditions. Auxiliary driving means comprise a reversible rotary motor 80, which may be of either the pneumatic, hydraulic or electric type. The motor 80 includes an output shaft 82 journaled by ball bearing assembly 84. The shaft 82 has formed thereon an irreversible worm 86 which engages a worm gear 88 attached to a shaft 90. The shaft 90 is rotatably journaled by ball bearing assembly 92 and has formed thereon an irreversible worm 94, which engages a worm gear 96 integral with the annular member 38. Since the worm gearing between the auxiliary driving means 80 and the member 38 is irreversible, the auxiliary driving means 80 can rotate the member 38 in either direction whereas when the auxiliary driving means are inactive, rotation of the member 38 is restrained in both directions. Thus, when the auxiliary driving means are inactive, the locking means are rendered operative to prevent rotation of the screw shaft 30 when a resistive torque load is imposed thereon by the piston rod 62 through the cup-shaped member 58. However, when the auxiliary driving means 80 are operative, the member 38 will be rotated so as to rotate the screw shaft 30 through the plain bearing elements 34 and 36 in lieu of fluid pressure operation with the locking means fully engaged, or simultaneously with fluid pressure operation of the actuator with the locking means partially engaged when the total resistive torque load is greater than the screw shaft torque.

*Operation*

During fluid pressure operation of the actuator, fluid under pressure is applied to either the retract chamber 20, or the extend chamber 18 and simultaneously therewith to the lock release chamber 70, while the other actuator chamber is connected to drain. Accordingly, the locking means are released and the piston 16 may be reciprocated relative to the cylinder 10, piston reciprocation effecting rotation of the screw shaft 30. Upon failure of the fluid pressure system, the spring 68 will thrust the lock piston 60 to the left so that the end thereof engages the member 58, thereby imposing a resistive torque load on the screw shaft to overload the plain bearing assembly and lock the screw shaft and piston against movement. Under these conditions, the auxiliary driving means 80 may be activated to rotate the member 38 in either direction, rotation of the member 38 effecting rotation of the screw shaft 30 through the engaged plain bearing locking means so as to reciprocate the piston 16.

Upon a partial loss of pressure in the fluid pressure system, the locking means, comprising the cup-shaped member 58, the piston 60 and the spring 68, will be partially engaged. That is, when the fluid pressure in chamber 70 drops, the member 58 will impose a resistive torque load on the screw shaft. If the total resistive load imposed on the screw shaft, i.e. resistive torque of the plain bearing assembly and the resistive torque of the partially engaged locking means, exceeds the screw shaft torque caused by the applied actuator load, as depicted by curve B in Figure 2, even though the total resistive torque load is less than it would be if the locking means were fully engaged, as depicted by curve C in Figure 2, operation of the auxiliary driving means 80 will be effective to rotate the screw shaft 30. Under these conditions, a friction drive is established between the element 36 and the member 58, and the shoulder 32 and either the element 36 or the element 34, depending upon the direction of the applied actuator load. This type of operation is termed simultaneous actuator operation by fluid under pressure in the auxiliary driving means since the auxiliary driving means will assist fluid under pressure in moving the piston.

While the embodiment of the present invention as herein disclosed, constitutes a preferred form, it is to be understood that other forms might be adopted.

What is claimed is as follows:

1. A dual drive actuator including, a cylinder, a reciprocable piston in said cylinder capable of fluid pressure actuation in both directions, a plain bearing assembly rotatably supported in the cylinder, a member rotatably supported in the plain bearing assembly and helically connected to said piston such that piston movement is dependent upon rotation of said member, releasable locking means operable to apply an axial clutching force between the plain bearing assembly and said member to prevent relative rotation between said plain bearing assembly and said member, an auxiliary means having irreversible driving connection with said plain bearing assembly for rotating said plain bearing assembly and said member to effect piston movement with the locking means engaged.

2. A dual drive actuator including, a cylinder, a reciprocable piston therein capable of fluid pressure actuation in both directions, a plain bearing assembly rotatably supported in said cylinder, a member rotatably supported in the plain bearing assembly and helically connected to said piston such that piston movement is dependent upon rotation of said member, locking means operable to apply an axial clutching force between the plain bearing assembly and said member to prevent relative rotation between said plain bearing assembly and said member, fluid pressure operated means to release said locking means to permit rotation of said member, and auxiliary driving means having an irreversible driving connection with said plain bearing assembly for rotating said plain bearing assembly and said member to effect piston movement with the locking means engaged.

3. An actuator assembly including a cylinder, a piston reciprocable therein, a plain bearing assembly rotatably supported in said cylinder having a pair of axially spaced bearing surfaces, a screw shaft having a shoulder disposed between said bearing surfaces for rotatably supporting said screw shaft, said screw shaft having a threaded connection with said piston whereby piston movement is dependent upon rotation of the screw shaft, a member connected to rotate with the screw shaft but movable axially thereof into engagement with one of said bearing surfaces on said plain bearing assembly, releasable means engageable with said member for moving it into engagement with said one bearing surface to apply an axial clutching force between said one bearing surface and said member to prevent relative rotation between said plain bearing assembly and said screw shaft, auxiliary driving means, and irreversible worm gearing connecting said auxiliary driving means and the plain bearing assembly for rotating said plain bearing assembly to reciprocate said piston.

4. A dual drive actuator including, a cylinder, a reciprocable piston disposed in the cylinder capable of fluid pressure actuation in both directions, a screw shaft journaled for rotation relative to the cylinder and threadedly connected to the piston whereby piston movement is dependent upon rotation of the screw shaft, said screw shaft having a shoulder thereon, a member rotatably journaled in the cylinder and carrying plain bearing elements having surfaces which engage said shoulder and journal said screw shaft for rotation relative to the cylinder, releasable means operable to apply an axial clutching force between the surfaces of the plain bearing elements and said shoulder to prevent rotation of the screw shaft relative to said member, and auxiliary driving means operatively connected with said member for rotating said screw shaft through said plain bearing elements when said axial clutching force is applied between the surfaces of said plain bearing elements and said shoulder.

5. The actuator set forth in claim 4 wherein the releasable means operable to apply said axial clutching force comprises a reciprocable piston having a rod operatively engageable with said member, fluid pressure means for moving said rod out of engagement with said member, and resilient means for moving said rod into engagement with said member.

6. The actuator set forth in claim 4 wherein the operative connection between said auxiliary driving means and said member comprises irreversible worm gearing whereby said auxiliary means may rotate said member but said member cannot rotate said auxiliary means.

7. An actuator assembly including, a cylinder, a piston reciprocable therein, a rotatable member disposed in said cylinder and helically connected to said piston such that piston movement is dependent upon rotation of said member, a plain bearing assembly rotatably supported in said cylinder for rotatably supporting said member, releasable means operable to apply an axial clutching force between the plain bearing assembly and said member to prevent relative rotation between said plain bearing assembly and said member, and auxiliary driving means having an irreversible driving connection with said plain bearing assembly for rotating said plain bearing assembly and said member to reciprocate said piston.

8. An actuator assembly including, a cylinder, a piston reciprocable therein, a rotatable member disposed in the cylinder and helically connected to the piston so as to rotate in response to piston movement, a plain bearing assembly rotatably supported within the cylinder for rotatably supporting said member, means operable to apply an axial clutching force between said plain bearing assembly and said member to prevent relative rotation between said member and said plain bearing assembly, means operable to release said axial clutching force to permit rotation of said member relative to said plain bearing assembly, and auxiliary means having an irreversible driving connection with said plain bearing assembly for rotating said member through said plain bearing assembly to reciprocate said piston.

References Cited in the file of this patent
UNITED STATES PATENTS
2,660,029    Geyer ---------------- Nov. 24, 1953